United States Patent
Takeshima

(10) Patent No.: US 6,291,604 B1
(45) Date of Patent: Sep. 18, 2001

(54) METHOD FOR PRODUCING POLY(P-T-BUTOXYSTYRENE)

(75) Inventor: Hiroharu Takeshima, Minoo (JP)

(73) Assignee: Sumitomo Chemical Company Limited, Osaka (JP)

( * ) Notice: Subject to any disclaimer, the term of this patent is extended or adjusted under 35 U.S.C. 154(b) by 0 days.

(21) Appl. No.: 09/655,409

(22) Filed: Sep. 5, 2000

(30) Foreign Application Priority Data

Sep. 6, 1999 (JP) .................................................. 11-251559

(51) Int. Cl.$^7$ .............................. C08F 2/04; C08F 116/16
(52) U.S. Cl. ................. 526/80; 526/78; 526/79; 526/87; 526/313
(58) Field of Search .................. 526/78, 79, 87, 526/313, 80

(56) References Cited

U.S. PATENT DOCUMENTS 5,412,050 * 5/1995 Watanabe et al. ................... 526/313
5,959,051 * 9/1999 Kaneko et al. .................. 526/313 X

FOREIGN PATENT DOCUMENTS

| 63-36602 | 7/1988 | (JP) . |
| 03-277608 | 12/1991 | (JP) . |
| 06-298869 | 10/1994 | (JP) . |

OTHER PUBLICATIONS

English Language Translation of JA Hei 4–53807, pulished Feb. 21, 1992.*

* cited by examiner

Primary Examiner—Fred Teskin
(74) Attorney, Agent, or Firm—Sughrue, Mion, Zinn, Macpeak & Seas, PLLC

(57) ABSTRACT

A method for producing poly(p-t-butoxystyrene) by a polymerization reaction of p-t-butoxystyrene characterized in that p-t-butoxystyrene or a solution thereof is added little by little to a mixture of the reaction solvent and the polymerization initiator, and water content of the p-t-butoxystyrene or a solution thereof is in a range of 5–70 ppm, and according to the method, poly(p-t-butoxystyrene) having narrow molecular weight distribution can be produced securely, with easy reaction temperature control.

3 Claims, No Drawings

METHOD FOR PRODUCING POLY(P-T-BUTOXYSTYRENE)

BACKGROUND OF THE INVENTION

The present invention relates to a method for producing poly(p-t-butoxystyrene).

More specifically, the present invention relates to a method for producing poly(p-t-butoxystyrene) by a polymerization of p-t-butoxystyrene characterized in that the raw material, the p-t-butoxystyrene or a solution thereof, has a water content in a specific range and is added to a mixture of a reaction solvent and a polymerization initiator.

Poly(p-t-butoxystyrene) is well-known as a raw material of resist used for producing LSI and the like. In recent years, those having narrow molecular weight distribution, particularly those having "weight average molecular weight(Mw) / number average molecular weight(Mn)" about 1.30 or smaller, more preferably 1.20 or smaller, are desired.

As an example of method for producing poly(p-t-butoxystyrene), JP-A-6-298869 discloses a method in which a solution of p-t-butoxystyrene is added to a mixture of a reaction solvent and a polymerization initiator.

According to this method, however, poly(p-t-butoxystyrene) having narrow molecular weight distribution is not necessarily obtained, and the compound having Mw/Mn exceeding 1.30 is often produced. Therefore, this method has an industrial problem.

On the other hand, as a method for obtaining poly(p-t-butoxystyrene) having narrow molecular weight distribution securely, a method in which a polymerization initiator is added at a stroke to a mixture of a reaction solvent and p-t-butoxystyrene is known(JP-A-8-29983). Although poly(p-t-butoxystyrene) having narrow molecular weight distribution can be obtained according to this method, the addition of polymerization initiator in a very short period causes very rapid proceeding of the exothermic reaction and abrupt heat generation. As a result, the temperature control becomes difficult, and this method also has an industrial problem.

The present inventors have conducted extensive studies to resolve the above problems of the conventional methods, and to develop a method for producing poly(p-t-butoxystyrene) having narrow molecular weight distribution securely not causing abrupt heat generation.

As a result, they have found that, when poly(p-t-butoxystyrene) is produced by a method in which p-t-butoxystyrene or a solution thereof is added to a mixture of a reaction solvent and a polymerization initiator, the molecular weight distribution of poly(p-t-butoxystyrene) is affected by water contained in the raw material, p-t-butoxystyrene or a solution thereof, as an impurity, and that poly(p-t-butoxystyrene) having narrow molecular weight distribution can be produced securely by using a p-t-butoxystyrene having water content in a specific range of 5–70 ppm. Thus, the present invention has been completed.

SUMMARY OF THE INVENTION

The present invention provides a method for producing poly(p-t-butoxystyrene) by a polymerization of p-t-butoxystyrene characterized in that the p-t-butoxystyrene or a solution thereof is added little by little to a mixture of a reaction solvent and a polymerization initiator, and water content in the p-t-butoxystyrene or the solution thereof is in a range of 5–70 ppm.

EMBODIMENT OF THE INVENTION

In the present invention, the polymerization of p-t-butoxystyrene is conducted in a reaction solvent.

Examples of the reaction solvent used include aromatic hydrocarbons such as benzene, toluene and xylene, aliphatic hydrocarbons such as hexane, heptane, cyclohexane and methylcyclohexane, ethers such as tetrahydrofuran, 1, 4-dioxane and ethyleneglycol dimethylether, and mixtures of two or more of them. Among them, a mixed solvent of a hydrocarbon and an ether is preferably used.

Amount of the reaction solvent is usually about 1–20 times by weight, preferably 2–10 times by weight, based on the amount of p-t-butoxystyrene.

In the present invention, a polymerization initiator is used for the polymerization of p-t-butoxystyrene.

As the polymerization initiator, for example, an organic alkali metal compound is used. Examples of the organic alkali metal compounds include organic lithium compounds such as n-butyllithium, sec-butyllithium, i-butyllithium, t-butyllithium, 2-methylbutyllithium and lithiumnaphthalene, and organic sodium compounds such as sodiumnaphthalene, sodiumanthracene, sodium-α-methylstyrenetetramer and sodiumbiphenyl. Among them, n-butyllithium, sec-butyllithium and the like are preferably used.

Amount of the organic alkali metal compounds to be used in the present invention varies based on the intended molecular weight of poly(p-t-butoxystyrene). Usually, the amount is preferably about $10^{-5}$–$10^{-3}$ mole per 1 g of p-t-butoxystyrene monomer.

In the present invention, p-t-butoxystyrene or a solution of p-t-butoxystyrene is added to a mixture of a reaction solvent such as that mentioned above and a polymerization initiator such as that mentioned above.

Examples of solvents used for producing the solution of p-t-butoxystyrene include aromatic hydrocarbons such as benzene, toluene and xylene, aliphatic hydrocarbons such as hexane, heptane, cyclohexane and methylcyclohexane, ethers such as tetrahydrofuran, 1, 4-dioxane and ethyleneglycol dimethylether, and mixtures of two or more of them. The solvent used for producing the solution of p-t-butoxystyrene may be either same as or different from the reaction solvent.

Amount of the solvent used for producing a solution of p-t-butoxystyrene is preferably about 0.05–10 times by weight, more preferably about 0.1–1 time by weight, based on the amount of p-t-butoxystyrene.

The water content in the p-t-butoxystyrene or a solution thereof used in the present invention is in a range of 5–70 ppm. If the water content exceeds 70 ppm, poly(p-t-butoxystyrene) having narrow molecular weight distribution is hardly obtained. Upper limit of the water content is preferably 60 ppm, more preferably 50 ppm.

On the other hand, a specific drying agent, a complicated purification process or the like is required in order to obtain p-t-butoxystyrene or a solution thereof having water content of less than 5 ppm. Therefore, such a low water content is not favorable. Lower limit of the water content is preferably 10 ppm The water content can be measured easily according to Karl Fischer method or the like.

P-t-butoxystyrene usually available contains some water which came, for example, from the atmosphere during its preservation. Therefore, when p-t-butoxystyrene is added singly to a mixture of a reaction solvent and a polymerization initiator, it is usually required to adjust the water content in p-t-butoxystyrene to the range defined in the present invention before adding the p-t-butoxystyrene. The water content can be adjusted to the range of 5–70 ppm, for example, by a distillation under a reduced pressure, or by a drying in which a drying agent such as molecular sieve, silica gel or the like is used. The drying in which a drying agent is used is convenient.

Similarly, a solvent used for producing a solution of p-t-butoxystyrene often contains some water which came, for example, from the atmosphere during its preservation. Therefore, when a solution of p-t-butoxystyrene is added to a mixture of a reaction solvent and a polymerization initiator, it is often required to adjust water content in the solution of p-t-butoxystyrene to the range defined in the present invention before adding the solution.

A solution of p-t-butoxystyrene having water content in a range of 5–70 ppm can be produced, for example, by a method in which p-t-butoxystyrene and the solvent are mixed, then the mixture is dried by a drying agent such as molecular sieve, silica gel or the like, or by a method in which p-t-butoxystyrene dried according to the above method and a solvent previously dried with a drying agent such as molecular sieve, silica gel or the like are mixed.

In the present invention, poly(p-t-butoxystyrene) is produced by a polymerization of p-t-butoxystyrene using one or more of reaction solvents and one or more of polymerization initiators. The polymerization reaction is conducted by adding p-t-butoxystyrene or a solution thereof little by little to a mixture of the reaction solvent and the polymerization initiator usually under a high vacuum or in atmosphere of an inert gas such as nitrogen.

The reaction temperature is usually in a range of –80–0° C., preferably about –50–0° C., more preferably about –50––10° C.

In the present invention, p-t-butoxystyrene or a solution thereof is added little by little to the mixture of the reaction solvent and the polymerization initiator. Rate of the addition should not vary largely and a large portion of p-t-butoxystyrene or a solution thereof should not be added in a short period in order attain the object of the present invention. The period of adding p-t-butoxystyrene or a solution thereof is usually from about 10 minutes to about 20 hours, preferably from about 15 minutes to about 5 hours. It is preferred that the same temperature as during the addition is kept for about 5 minutes–about 5 hours, after the addition is completed.

The polymerization reaction can be terminated by adding small amount of polymerization terminator, such as water and methanol.

Then, poly(p-t-butoxystyrene) having narrow molecular weight distribution can be isolated by distilling out the solvent from the reaction mass. The obtained poly(p-t-butoxystyrene) can be purified, for example, by adding it to methanol or the like after distilling out the solvent.

The molecular weight distribution, Mw/Mn, is calculated from the number average molecular weight converted to polystyrene (Mn) and weight average molecular weight converted to polystyrene (Mw) which are obtained by a gel permeation chromatography (GPC).

The present invention is explained in more detail referring to the following examples. The examples should not be construed to limit the scope of the present invention.

EXAMPLE 1

To a 1000 cm$^3$ flask in which air was replaced with nitrogen, 587 cm$^3$ of hexane, which had been dried with a molecular sieve and had water content of 12 ppm, and 5.9 mmol of sec-butyllithium were added, and cooled to –40° C. Thereto, a mixture of 88 g of p-t-butoxystyrene monomer and 6 cm$^3$ of ethyleneglycol dimethylether, the mixture being dried with a molecular sieve to have water content of 12 ppm measured according to Karl Fisher method, was added dropwise over one hour. After the addition, polymerization was further conducted for 10 more minutes at –20° C., and about 3 cm$^3$ of methanol was added to terminate the reaction. Then, a portion of the reaction mixture was picked and the solvent was distilled off from the portion to obtain poly(p-t-butoxystyrene) as a white solid product. Number average molecular weight (Mn) of the poly(p-t-butoxystyrene) converted to polystyrene measured by GPC was 14,900, and Mw/Mn thereof was 1.12.

EXAMPLE 2

To a 1000 cm$^3$ flask in which air was replaced with nitrogen, 587 cm$^3$ of hexane, which had been dried with a molecular sieve and had water content of 7 ppm, and 5.9 mmol of sec-butyllithium were added, and cooled to –40° C. Thereto, a mixture of 88 g of p-t-butoxystyrene monomer and 6 cm$^3$ of ethyleneglycol dimethylether, the mixture being dried with a molecular sieve to have water content of 43 ppm, was added dropwise over one hour. After the addition, polymerization was further conducted for 10 more minutes at –20° C., and about 3 cm3 of methanol was added to terminate the reaction. Then, a portion of the reaction mixture was picked and the solvent was distilled off from the portion to obtain poly(p-t-butoxystyrene) as a white solid product. Number average molecular weight (Mn) of the poly(p-t-butoxystyrene) converted to polystyrene measured by GPC was 14,300, and Mw/Mn thereof was 1.18.

Comparative Example 1

To a 1000 cm$^3$ flask in which air was replaced with nitrogen, 730 cm$^3$ of hexane in which water content had been thoroughly removed by a molecular sieve and 5.6 mmol of sec-butyllithium were added, and cooled to –40° C. Thereto, a mixture of 95 g of p-t-butoxystyrene monomer and 6 cm$^3$ of ethyleneglycol dimethylether, water content of the mixture being 83 ppm, was added dropwise over one hour. After the addition, polymerization was further conducted for 10 more minutes at −20° C., and about 2 cm³ of methanol was added to terminate the reaction. Then, a portion of the reaction mixture was picked and the solvent was distilled off from the portion to obtain poly(p-t-butoxystyrene) as a white solid product. Number average molecular weight (Mn) of the poly(p-t-butoxystyrene) converted to polystyrene measured by GPC was 18,400, and Mw/Mn thereof was 1.33.

Reference Example 1

To 730 cm³ of hexane, in which water content had been thoroughly removed by a molecular sieve and had water content of about 6 ppm, in a 1000 cm³ flask in which air was replaced with nitrogen, a mixture of 95 g of p-t-butoxystyrene monomer and 6 cm³ of ethyleneglycol dimethylether, water content of the mixture being 87 ppm, was added, and cooled to −40° C. Thereto, 5.0 mmol of sec-butyllithium was added at one stroke. After the addition, polymerization was conducted for 10 minutes at from −20° C. to −30° C., and about 2 cm³ of methanol was added to terminate the reaction. Then, a portion of the reaction mixture was picked and the solvent was distilled off from the portion to obtain poly(p-t-butoxystyrene) as a white solid product. Number average molecular weight (Mn) of the poly(p-t-butoxystyrene) converted to polystyrene measured by GPC was 18,200, and Mw/Mn thereof was 1.09.

According to the present invention, poly(p-t-butoxystyrene) having narrow molecular weight distribution can be produced securely by using a p-t-butoxystyrene or a solution thereof in which the water content is in a specific range of 5–70 ppm, and by adding the p-t-butoxystyrene or a solution thereof little by little to a mixture of the reaction solvent and the polymerization initiator. Further, not generating the reaction temperature abruptly, it makes reaction temperature control easier.

What is claimed is:

1. A method for producing poly(p-t-butoxystyrene) by a polymerization reaction of p-t-butoxystyrene characterized in that p-t-butoxystyrene or a solution thereof is added over a period of about 10 minutes to about 20 hours to a mixture of a reaction solvent and a polymerization initiator, and water content of the p-t-butoxystyrene or a solution thereof is in a range of 5–70 ppm.

2. A method according to claim 1 wherein the p-t-butoxystyrene or a solution thereof is added to a mixture of the reaction solvent and the polymerization initiator over a period of about 15 minutes to about 5 hours.

3. The method according to claim 1 wherein the polymerization reaction is conducted at a temperature in a range of −80–0° C.

* * * * *